May 6, 1941. A. E. LECHLEITNER 2,241,265

PHOTOGRAPHIC FILM MAGAZINE

Filed Nov. 4, 1939

ALOYSIUS E. LECHLEITNER
INVENTOR

BY Newton M. Perrins
George A. Gillett Jr.
ATTORNEYS

Patented May 6, 1941

2,241,265

UNITED STATES PATENT OFFICE 2,241,265

PHOTOGRAPHIC FILM MAGAZINE

Aloysius E. Lechleitner, Rochester, N. Y., assignor to Eastman Kodak Company, Rochester, N. Y., a corporation of New Jersey Application November 4, 1939, Serial No. 302,909

5 Claims. (Cl. 88—17)

This invention relates to a photographic film magazine and more particularly to a film magazine having a floating gate member.

It is known to the prior art that floating gate members may be used advantageously in film magazines. It is also known that the lateral wall of a magazine casing may be embossed for engagement with the margins of film in the magazine to prevent abrasion of the central or picture areas of the film.

The primary object of the present invention is the provision of a film magazine having a floating gate member and including a resilient member encircling the casing and adjacent the lateral wall thereof, having film-engaging portions for engaging only the margins of a film strip to prevent abrasion of the central area thereof and also engaging said floating gate member to urge the same toward the lateral wall of the magazine casing.

A further object of the invention is the provision of a floating gate member or film guiding member within the magazine casing and having a displaced portion in which a magazine shutter is movably mounted, the thickness of said shutter being equal to the depth of said displaced portion of the film guiding member so that the resilient means acting upon the film guiding member normally urges the same toward the lateral wall of the magazine, so that the magazine shutter is frictionally gripped between said lateral wall and said displaced portion, and so that the undisplaced part of said film guiding member is pressed against said lateral wall.

Other and further objects of the invention will be apparent to those skilled in the art from the disclosure which follows.

Reference is now made to the accompanying drawing wherein similar reference characters designate similar elements and wherein.

Figure 1:
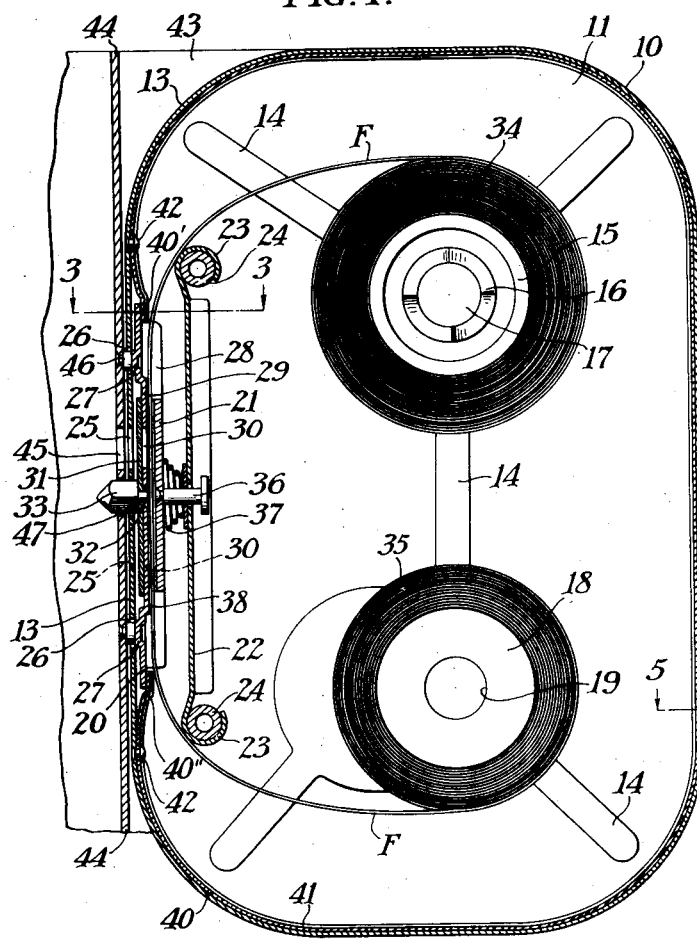
Fig. 1 is a longitudinal section of a film magazine according to the invention and showing the position of the internal parts of the magazine when it is associated with a camera.
Figure 2:
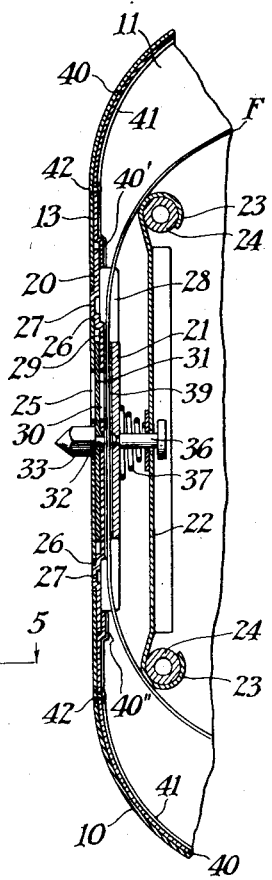
Fig. 2 is a fragmentary longitudinal section of the film gate of the magazine showing the internal parts in normal position or when the magazine is not associated with the camera.
Figure 3:
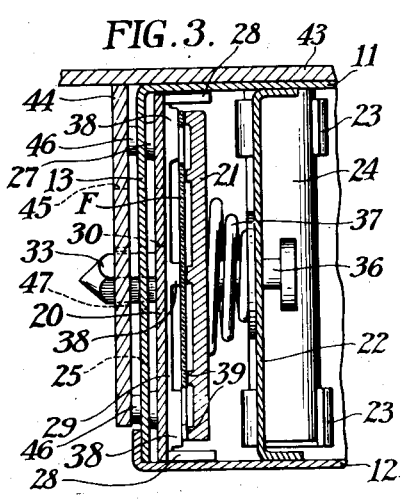
Fig. 3 is a transverse cross section through the film gate taken on the line 3—3 of Fig. 1.
Figure 5:
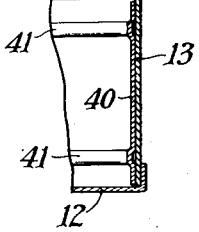
Fig. 5 is a fragmentary transverse section of the magazine wall taken on the line 5—5 of Fig. 1.

As illustrated herein, the film magazine may comprise a magazine casing 10 having a side wall 11, a cover 12, see Figs. 3 and 5, and having a lateral wall 13 extending around the edges of said wall 11. The side walls of the magazine, such as side wall 11, may be provided with embossings 14 for engaging the side edges of the film and reduce its area of contact with said side walls.

The film supply may be arranged within the magazine in any known manner. One arrangement for the film supply may comprise a supply film core 15 having teeth 16 and rotatably mounted upon a spindle 17 which is fastened to the side wall 11. The take-up film core 18 is provided with an axial opening 19 and is rotatably mounted on a spindle, not shown, on the cover 12.

The film gate is of the floating type and comprises a film guide 20, a pressure pad 21, and a support 22 having end clips 23 fitting over posts 24 on side wall 11. The front portion of lateral wall 13 is provided with one or more exposure apertures 25 and a plurality of holes 26. The film guide 20 has a plurality of protuberances 27 arranged to fit into holes 26, has side flanges 28 spaced for side guiding of the film at the gate and has a displaced portion 29 which is also provided with one or more exposure apertures 30 corresponding to the exposure apertures 25 in lateral wall 13.

A shutter member 31 is attached to a shutter operating pin 32 which is journaled at its inner end in the film guide 20 and which has a square portion 33 extending through the front portion of lateral wall 13. Said shutter member 31 is arranged in a known manner to be movable into a closed position for covering the exposure apertures 25 and 30 and into an open position for uncovering said exposure apertures 25 and 30. In the present instance movement or rotation of the shutter member 31 is accomplished by rotating the square portion 33 of the shutter operating pin 32. The shutter member 31 has a thickness equal to the depth of the displaced portion 29 in film guide 20.

A film within the magazine extends from supply film roll 34 on supply film core 15 over the end clips 23 of support 22 between the side flanges 28 of film guide 20 and to the take-up film roll 35 on take-up core 18. The intervening film strip F is held against the film guide 20 by the pressure pad 21 which is supported by a headed stud 36 passing through an opening in support 22 and which is urged forwardly by a conical spiral spring 37 between pressure pad 21 and support 22. In order to prevent abrasion or scratching of the picture areas of the film strip F, the film guide 20 or film contacting surface of the displaced portion 29 is provided with film-engaging ridges 38 and the front face of pressure pad 21 is provided with longitudinal ridges 39.

It has previously been the custom to provide resilient means for urging the floating gate member toward or through the lateral wall of the film magazine and separate or independent film guiding means to prevent the film in its passage within the magazine from becoming scratched by the lateral wall of the magazine casing. According to the present invention these formerly separate means are now consolidated into a single resilient member or spring band 40 which encircles the magazine casing 10 adjacent the lateral wall 13, which has film engaging portions 41 for engaging only the margins of the film to prevent abrasion of the central area thereof, and having its ends arranged to engage the film guide 20 to urge it toward the lateral wall 13. The film engaging portions 41 are preferably embossed into the spring band 40 to form spaced parallel ridges extending around said spring band 40, see Fig. 5. The ends of spring band 40 have offset portions 40' and 40" which engage the undisplaced portion of film guide 20 to urge the same toward the lateral wall 13. Said offset portions 40' and 40" of the spring band 40 also serve to support the film guide 20 with its protuberances 27 in registry with the holes 26 in lateral wall 13 and with its exposure apertures 30 in registry with the exposures 25 in lateral wall 13.

Rivets 42 are preferably used and fasten the spring band 40 to the lateral wall 13 near the opposite ends of the film gate or adjacent the ends of film guide 20. The spacing of said rivets 42 from the film guide 20 may be varied as desired to increase or decrease the spring pressure exerted upon the film guide 20.

Figure 4:
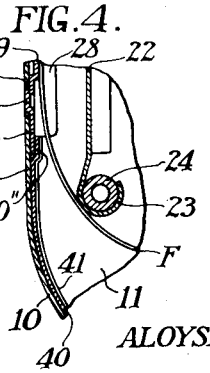
Fig. 4 is a fragmentary longitudinal section of the film magazine showing the modified arrangement of the encircling spring band therein.

Alternatively, the rivets 42 may be eliminated, see Fig. 4, and the spring band 40 formed of stiff or tempered spring stock. In this manner assembly of the magazine parts is facilitated and the advantages of the invention are also obtained.

Before the film magazine is inserted into its associated apparatus, the spring band 40 or off-set ends 40' or 40" thereof press the undisplaced portions of film guide 20 against the front portion of lateral wall 13 and urge protuberances 27 into holes 26 of lateral wall 13 in dust and light-sealing relationship. Since shutter member 31 is equal in thickness to the depth of displaced portion 29, said shutter member 31 will be simultaneously and frictionally gripped between the lateral wall 13 and the displaced portion 29 of film guide 20. As a result, more resistance is offered to movement of the shutter member 31 by its operating pin 32 or square portion 33 when the magazine is not in the apparatus.

The associated apparatus or camera may comprise a mechanism plate 43 carrying a front plate 44 which is provided with an exposure opening 45 for registry with exposure apertures 25 and 30 of the magazine and which carries a plurality of projections 46 arranged to enter the holes 26 in the lateral wall 13 of the magazine. Said front plate 44 is also provided with an opening 47 to receive the square portion 33 of the shutter operating pin 32.

When the film magazine is inserted into the apparatus or camera with its exposure apertures 25 and 30 in alignment with said exposure opening 45, the projections 46 on front plate 44 enter the holes 26 in the lateral wall 13 of the magazine and abut against the protuberances 27 on film guide 20 to displace said film guide 20 with respect to lateral wall 13. Such displacement of film guide 20 takes place against the resilient action of the ends of spring band 40 and relieves the frictional gripping of shutter member 31 so that it may be more freely operated or moved to open or closed positions.

Upon operation of the apparatus or magazine camera, the inherent resiliency of the film may cause portions of the film to expand and rub against the film-engaging portions 41 of spring band 40. However, the parallel and spaced arrangement of said film-engaging portions 41 to engage only the margins of the film F will prevent the central or picture areas of said film F from becoming scratched. Thus the resilient member or spring band 40 performs two functions, one to exert the resilient pressure on film guide 20 and urge it forwardly toward the lateral wall 13, the other to prevent abrasion or scratching of the central areas of the film F as just explained.

Since modifications of the present invention can be made without departing from the spirit of the invention, the present disclosure is to be construed in an illustrative sense and the scope of the invention is defined by the claims which follow.

Having now particularly described my invention what I desire to secure by Letters Patent of the United States and what I claim is:

1. In a film magazine, the combination with a casing having a lateral wall provided with an exposure aperture, and a film gate adjacent said lateral wall and including a film guide movable toward and away from said wall and for guiding a film past said exposure aperture in parallel relation to said lateral wall, of a resilient member encircling said casing adjacent said lateral wall, having film engaging portions for engaging only the margins of a film to prevent abrasion of the central area thereof and engaging said film guide to urge the same toward said lateral wall.

2. In a film magazine, the combination with a casing having a lateral wall provided with an exposure aperture, a pair of film cores rotatably mounted in said casing for rotation about axes parallel to said lateral wall, and a film gate adjacent said lateral wall and including a film guide movable toward and away from said lateral wall and parallel thereto for guiding a film, in its path from one film core to the other, past said exposure aperture, of a spring member encircling said film cores adjacent said lateral wall, having film engaging portions for engaging only the margins of a film to prevent abrasion of the central area thereof, and having its ends engaging said film guide to urge the same toward said lateral wall.

3. In a film magazine, the combination with a casing having a lateral wall provided with an exposure aperture, and a film gate adjacent said lateral wall and including a film guide movable toward and away from said wall and for guiding a film past said exposure aperture in parallel relation to said lateral wall, of a spring band encircling said casing adjacent said lateral wall, having parallel embossed ridges spaced to engage only the margins of a film and prevent abrasion of the central area thereof and having its ends off-set to support said film guide and press the same toward said lateral wall.

4. In a film magazine, the combination with a casing having a lateral wall provided with an exposure aperture, a pair of film cores rotatably mounted in said casing for rotation about axes parallel to said lateral wall, and a film gate adjacent said lateral wall and including a film guide movable toward and away from said lateral wall and parallel thereto for guiding a film, in its path from one film core to the other, past said exposure aperture, of a spring band encircling said casing within and adjacent said lateral wall, having parallel embossed ridges spaced to engage only the margins of a film, and having its ends off-set to overlap and support said film guide and for pressing said guide toward said lateral wall, and fastening means between said lateral wall and said spring band adjacent said film guide.

5. In a film magazine, the combination with a casing having a wall provided with an exposure aperture, a film guiding member movable within said casing toward and way from said wall and having a displaced portion provided with an aperture, and a shutter member movably mounted within said displaced portion and for covering and uncovering said apertures, the thickness of said shutter member being equal to the depth of said displaced portion of the film guiding member, of a resilient means engaging said film guiding member and normally urging the same toward said wall so that said shutter member is frictionally gripped between said wall and the displaced portion of said film guiding member and so that the undisplaced part of said film guiding member is pressed against said wall.

ALOYSIUS E. LECHLEITNER.